United States Patent [19]
Werner et al.

[11] 3,758,631
[45] Sept. 11, 1973

[54] POLYCAPROLACTAM BLOCK POLYMERS OF POLYESTERS

[75] Inventors: Byron H. Werner, Akron; Robert A. Hayes, Cuyahoga Falls, both of Ohio

[73] Assignee: The Firestone Tire & Rubber Company, Akron, Ohio

[22] Filed: July 12, 1971

[21] Appl. No.: 161,964

[52] U.S. Cl. 260/830 P, 260/77.5 AM, 260/77.5 AN, 260/857 PE, 260/858
[51] Int. Cl. ............................................. C08g 45/12
[58] Field of Search .................. 260/858, 77.5 AN, 260/77.5 AM, 830 P, 857 PE

[56] References Cited
UNITED STATES PATENTS

| | | | |
|---|---|---|---|
| 3,704,280 | 11/1972 | Loos | 260/858 |
| 3,028,369 | 4/1962 | Butler | 260/77.5 AN |
| 3,511,893 | 5/1970 | Schaeffer | 260/77.5 AN |
| 3,186,971 | 6/1965 | Hostlettler | 260/77.5 AN |
| 3,509,102 | 4/1970 | Horn | 260/77.5 AN |
| 3,320,335 | 5/1967 | Hedrick | 260/858 |
| 3,468,975 | 9/1969 | Duxbury | 260/857 PE |
| 3,493,632 | 2/1970 | Okazaki | 260/858 |
| 3,632,536 | 1/1972 | Iwakura | 260/77.5 AM |

FOREIGN PATENTS OR APPLICATIONS

| | | | |
|---|---|---|---|
| 1,222,254 | 8/1966 | Germany | 260/77.5 AN |
| 44/16023 | 7/1969 | Japan | 260/857 PE |

*Primary Examiner*—Paul Lieberman
*Attorney*—S. M. Clark et al.

[57] ABSTRACT

Block copolymers of polycaprolactam and polylactone are produced by reacting, in the presence of an anionic catalyst, caprolactam with a polylactonediol which has been end-grouped, and optionally chain-extended, with a diisocyanate. The products are useful in elastic articles such as pneumatic tires, threads, etc., and as components of melt adhesives.

10 Claims, No Drawings

POLYCAPROLACTAM BLOCK POLYMERS OF POLYESTERS

FIELD OF THE INVENTION

This invention relates to a process of producing block copolymers of polylactams and polylactones, and to the resultant products.

BACKGROUND OF THE INVENTION

Caprolactam has heretofore been polymerized in catalytic systems comprising low molecular weight mono- and polyurethanes in the presence of anionic catalysts, see for instance Hedrick et al. U. S. Pat. No. 3,320,335. The resultant polymers comprise essentially simple uninterrupted sequences of caprolactam residues extending to high molecular weight, and have properties of polycaprolactam resins. Also caprolactam has been end-grafted to 6,6 nylon, and again the products have only the anticipated resinous properties.

Accordingly, it would be highly desirable to provide graft polymers of caprolactam having properties other than are to be anticipated for the simple end-chaining of long blocks of poly (caprolactam) structure onto existing polymers. Particularly, it would be desirable to modify the properties to a greater or less extent in the direction of elastomeric materials, particularly if such materials could be formed by fluid casting techniques into various shapes and configurations which may be required for particular end uses.

SUMMARY OF THE INVENTION

The above and other objects are secured, in accordance with this invention by reacting, in the proportions indicated:

| | |
|---|---|
| A polylactone diol | 1 mole | with

| | |
|---|---|
| A diisocyanate | 1-2 moles | and thereafter reacting

The reaction product of the polylactone and diisocyanate with

| | |
|---|---|
| Caprolactam | 0.5–1.5 grams per gram of polylactone diol used in the preparation of the reaction product of polylactone diol and diisocyanate | in the presence of

| | |
|---|---|
| An anionic catalyst for the polymerization of caprolactam | a catalytic amount |

The poly(lactone) may be the polymer of any lactone containing four to 12 carbon atoms, and the diisocyanate may be any otherwise generally inert hydrocarbon or other organic nucleus having two isocyanate groups attached thereto. Contrary to expectation, the products tend more to an elastomeric or rubbery character rather than resinous, as would be expected from the character of the grafted caprolactam. The products exhibit relatively high molecular weight as measured viscometrically; but when treated so as to degrade the poly(lactone) substrate, the surviving poly(caprolactam) segments appear to be of low molecular weight. Without absolute commitment to the theory, it would appear from the foregoing that, instead of grafting in long blocks at the attachment points to the poly(lactone) substrate, the caprolactam must somehow cut the polylactone chain at intervals, and insert itself as relatively short poly(caprolactam) blocks, so that the product consists of chains of alternating poly(lactone) and poly(caprolactam) blocks.

As initially prepared, the products are readily flowable at moderately elevated temperatures and can be cast into molds, extruded, calendered, pressed, etc. to form any of a wide variety of elastomeric objects. Also, particularly those products higher in caprolactam content, they may serve as hot-melt adhesives.

DESCRIPTION OF THE PREFERRED EMBODIMENTS

The Poly(lactone) Constituent

This may be any generally linear polymer of molecular weight on the order of 1,000–4,500, made up of chains of the units (I) 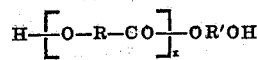

wherein:

"x" is an integer determining the molecular weight of (I)"  R is a hydrocarbon, halohydrocarbon or other generally inert organic radical containing 3 to 12 carbon atoms.

R' is an aliphatic radical containing 2–10 carbon atoms.

Such polymers are conventionally prepared by the polymerization of lactones of the formula (II) 

in the presence of compounds of the formula HO R'OH under the same notation, and hence they are designated "poly(lactones)." It will be appreciated, of course, that such polymers may be arrived at by other routes, for instance by the polycondensation of the hydroxy acids, acid chlorides, volatile-alcohol esters, etc. corresponding to the lactones of Formula (II). Lactones from which the poly(lactone diols) of Formula (I) are derived include, for instance, (the preferred) e-caprolactone, pivalolactone, valerolactone, methyl caprolactone, caprylic lactone, undecanoic lactone, dodecanoic lactone.

THE DIISOCYANATES

Suitable diisocyanates are those having the formula:

wherein $R_1$ is a hydrocarbon, halohydrocarbon or other generally inert organic radical containing up to 20 carbon atoms. Suitable diisocyanates will be seen to include (the preferred) tolylene 2,4- and/or 2,6-diisocyanate, 4,4'-diisocyanato-diphenylmethane, diphenyl-4,4'diisocyanate, m-phenylene diisocyanate, p-phenylene diisocyanate, xylylene diisocyantes, 4-chloro-1,3-phenylene diisocyanate, benzophenone-4,4'-diisocyanate, benzofurane-2,7-diisocyanate, 1,5-naphthalene diisocyanate, 1,5-tetrahydronaphthalene diisocyanate, 1,4-cyclohexylene diisocyanate, 1,4-tetramethylene diisocyanate, 1,6-hexamethylene diisocyanate, 1,10-decamethylene diisocyanate, and 4,4'-methylene-bis (cyclohexyl isocyanate).

As to the amount of diisocyanate to be used, this may be varied from 1 to 2 mols, preferably 1.5 to 2.0 mols, of diisocyanate per mol of the polylactone diol. At the extreme limits, when two mols of diisocyanate are used, the polylactone is end-capped at both ends, and chain-extension does not take place to any considerable extent. When lesser quantities going down into the neighborhood of one mole are used, extensive chain extension occurs. The reaction is carried out by mixing and stirring the polylactone diol (previously dehydrated, if substantial amounts of water are present) in molten form with the selected diisocyanate. Temperatures will usually be on the order of 65°–130°C., and the reaction will proceed to the desired extent in about 15 minutes to 3 or 4 hours. When the amount of diisocyanate is relatively small, say down to 1.25 moles per mole of poly(lactone), it will be desirable to cut the reaction time short, as there is a tendency to form species of extremely high molecular weight and/or cross-linking which would lead to unmanageable gels.

The Reaction With Caprolactam and Anionic Catalyst

This may conveniently be carried out immediately in the same vessel in which the antecedent reaction with diisocyanate was carried out, while the product is still molten. Alternatively, the initial product may have been cooled, solidified, stored until desired, and re-melted. In either case, the caprolactam and molten poly(lactone)/diisocyanate reaction product are stirred together at temperatures in the range of 100° to 250°C. preferably 140° to 190°C. in the presence of any of the known anionic catalysts for the polymerization of caprolactam. Suitable anionic catalysts are exemplified in the free alkali and alkaline earth metals, or aluminum (preferably supplied as dispersions in inert media) such as lithium, sodium, potassium, cesium, rubidium, magnesium, calcium, strontium, barium and the like. Instead of the free metals, there may be employed the hydrides, organometallic derivatives, grignard-type compounds, and hydroxides, and alkaline salts of these metals, such as phenyl sodium, ethyl lithium, sodium hydride, ethyl magnesium chloride, diethyl aluminum chloride, butyl lithium, lithium naphthalene, sodium naphthalene, stilbene dilithium, magnesium, magnesium alkoxides of one to four carbon atoms and other alkali metal compounds such as carbonates and phenolates. The amount of such catalysts will be relatively small, catalytic, amounts, say on the order of 0.05 to 1.5 mole per mole of isocyanate groups (it will be understood that each mole of diisocyanate provides two moles of isocyanate group) used in the chain extension step. The resultant grafting of poly(caprolactam) blocks with the poly(lactone) chains will proceed rapidly and will be complete within 0.1 to 18 hours. At the end of this time, the grafted product may either be molded, cast, extruded or otherwise formed into the desired article; or it may be cooled and solidified for storage and fabrication at a subsequent time. Water extraction measures conversion of the lactam to polymer. Acetone extraction measures the amount of polylactone which is not blocked.

The high degree of grafting of the caprolactam onto the poly(lactone) may be demonstrated and evaluated by subjecting the product to successive extraction with water and with acetone. Both figures will usually be found to be quite low. Viscometric determination of the molecular weights of the products in nondestructive solvents such as phenol/tetrachloroethane, indicated that the products consisted of long chains rather than heavily side-grafted or cross-linked products. However, when the molecular weight is determined in a solvent such as sulfuric acid, which destroys the poly(lactone) segments, relatively low molecular weights are observed. From this it is postulated that the caprolactam chains have by some mechanism become inserted linearly into the lactone chains so as to give a longitudinal repeating block polymer according to the scheme —(polylactone block) — (polycaprolactam block) — (polylactone block)—

The novel chemical structure is reflected in the physical properties of the products, which tend to be elastomeric rather than resinous in character, and in molten form at temperatures on the order of 140° to 250°C. may be molded, cast centrifugally or otherwise, pressed, calendered, extruded or spun to form a wide variety of elastomeric products such as tires, isolation mountings, wire insulation, tubing, extruded gasketing and other profiles, elastic thread, and the like. The products also may serve as hot-melt adhesives and/or components of hot-melt adhesive compositions.

With the foregoing general discussion in mind, there are given herewith detailed examples of the practice of the invention. All parts and percentages are by weight unless otherwise specified.

EXAMPLE I

| | |
|---|---|
| Poly(epsilon caprolactone) diol (mol. wt. 2029, "Niax D560", a product of Union Carbide Corporation) | 120 grams (0.0591 mole) |
| Tolylene diisocyanate | 13.7–20.6 g. (0.0786–0.1195 moles, per Table I) |
| Caprolactam | 120–180 grams (per Table I) |
| Sodium dispersion (50% in mineral oil) | 0.45–0.68 grams (0.0098–0.01478 moles Na, per Table I) |

A series of runs were made in accordance with the above schedule, varying the ingredients from run to run in order to provide varying weight and mole ratios of the ingredients as indicated in Table I. In each run the polycaprolactone diol was charged into a flask provided with a stirrer, a vacuum connection and a heating mantle, and heated at 85°–90°C. and stirred under vacuum for 1 hour to dehydrate and deaerate the polycaprolactone. The toluene diisocyanate was then added, and heating at 85°–90°C. and stirring continued for 5 hours. The caprolactam and sodium dispersion were then added to the flask and stirred in, and the contents poured into bottle under a blanket of nitrogen. The bottle was then sealed and heated for 18 hours at 160°C. At the end of this time, the bottle was broken open to recover the product.

The products were then subjected to tests, the results of which are set forth in Table I. Certain of the tests (relative viscosity, etc.) are special, and are described herewith. The other tests are standard.

Relative Viscosity - Phenol/TCE

This is the relative viscosity of the polymer determined at 25°C. in a solution containing 0.5 gram of the polymer in 100 grams of a mixture of equal parts by weight of phenol and tetrachloroethane (TCE).

Relative Viscosity - $H_2SO_4$

This is the relative viscosity of the polymer determined at 25°C. in a solution containing 1.0 gram of the polymer dissolved in 100 ml. of 98 percent sulfuric acid.

Plasticity

A 0.5 gram sample of the polymer is placed between aluminum sheets and inserted in a flat-platen laboratory press. The platen temperature was 145°–235°C., and a total load of 2,000 lbs. was applied for 30 sec. The area of the resultant plaque in square millimeters is reported as "plasticity".

Water Extractable

A 2.5 gram sample of the polymer is pressed into a plaque, which was then stirred in 1,800 ml. of distilled water for 20 hours, and then reweighed. The loss in weight of the sample is reported as "Percent Extractable", presumably caprolactam monomer. The percentage is on the basis of the weight of the original 2.5 gram sample.

Acetone Extractable

The plaques which had been extracted with water were then stirred for 18 hours in 1,000 ml. of acetone at 25°C. The loss in weight is reported as "Percent Acetone Extractable," the percentage being on the basis of the weight of the original 2.5 gram sample. Following are the results of the tests.

Properties of the filament were:

| | |
|---|---|
| Denier | 755 |
| Tenacity | 1.08 g./denier |
| Elongation | 44.9% |

EXAMPLE III

| | |
|---|---|
| Polycaprolactone (mol. wt. 2029: "Niax D 560", a product of Union Carbide Corporation) | 100 grams (0.048 mole) |
| Tolylene diisocyanate | 8.56 grams (0.049 mol) |
| Caprolactam | 66.7 |
| Sodium dispersion (50%, in mineral oil) | 100 grams 0.187–0.75 (0.0041–0.0163 mol. No. per Table I) |

A series of runs was made in accordance with the above recipe, varying the caprolactam and sodium dispersions from run to run. The procedure of Example I was followed, except that the heating and stirring of the polycaprolactone at 85°–90°C. before addition of caprolactam and sodium was shortened to 2 hours instead

TABLE I

| | Weight (grams of) reactants varied | | | Mole ratio, Na/NCO | Percent extractables | | Tensile strength | | Modulus at elongation of— | | | Hardness, Shore | Rel. visc. in— | | Plasticity (mm.) at temp. (° C.) of— | | |
|---|---|---|---|---|---|---|---|---|---|---|---|---|---|---|---|---|---|
| Run | Toluene diisocyanate | Caprolactam | Sodium dispersion | | H₂O | Acetone | P.s.i. | Percent | 100 percent | 300 percent | 500 percent | | Phenol | H₂SO₄ | 145 | 185 | 235 |
| 1 | 20.6 | 120 | 0.54 | 0.10 | 17.6 | 10.6 | 925 | 480 | 200 | 325 | 850 | 70A | (¹) | 1.19 | | | |
| 2 | 20.6 | 120 | 1.35 | 0.25 | 7.4 | 3.8 | 2,975 | 480 | 950 | 1,400 | 2,950 | 43D | (¹) | 1.17 | | | |
| 3 | 20.6 | 80 | 0.54 | 0.10 | 12.5 | 22.8 | | | | | | | | | | | |
| 4 | 20.6 | 80 | 1.35 | 0.25 | 6.9 | 9.8 | 2,075 | 505 | 500 | 700 | 1,625 | 76A | | | | | |
| 5 | 15.4 | 120 | 0.68 | 0.25 | 7.6 | 4.6 | 2,850 | 605 | 1,025 | 1,525 | 2,350 | 42D | 3.01 | 1.17 | | | |
| 6 | 15.4 | 120 | 1.30 | 0.50 | 4.8 | 5.4 | 2,688 | 500 | 1,050 | 1,675 | 2,688 | 43D | 2.35 | 1.17 | | | |
| 7 | 15.4 | 80 | 0.68 | 0.25 | 8.5 | 10.0 | 2,475 | 700 | 500 | 675 | 1,365 | 80A | (¹) | | | | |
| 8 | 15.4 | 80 | 1.36 | 0.50 | 6.7 | 13.6 | 1,765 | 595 | 500 | 625 | 1,400 | 82A | (¹) | | | | |
| 9 | 13.7 | 120 | 0.45 | 0.25 | 11.6 | 3.8 | 2,250 | 550 | 950 | 1,425 | 2,075 | 39D | 2.50 | 1.17 | 3,150 | 6,050 | 17,300 |
| 10 | 13.7 | 120 | 0.90 | 0.50 | 6.0 | 4.4 | 2,625 | 610 | 960 | 1,250 | 2,080 | 40D | 2.78 | 1.18 | 2,800 | 3,950 | 15,000 |
| 11 | 13.7 | 120 | 1.35 | 0.75 | 5.0 | 5.2 | 1,800 | 410 | 1,050 | 1,250 | | 42D | 1.90 | 1.13 | 3,800 | 5,900 | 13,500 |
| 12 | 13.7 | 120 | 1.80 | 1.00 | 5.0 | 6.1 | 1,575 | 400 | 980 | 1,050 | | 42D | 1.78 | 1.16 | 4,000 | 6,800 | 14,000 |

¹ Gel.

It will be seen from Runs Nos. 1–4 that with the lower sodium levels the extractables were higher, indicating a less efficient lactam polymerization and less efficient blocking. Also the tensile properties were less excellent. The products of Run Nos. 1–4 contained considerable gel, which appears to be due to the relatively higher levels of isocyanate, since the subsequent runs employing less diisocyanate did not contain gel. It will also be seen that the relative viscosities decrease with increasing sodium concentration, see Runs Nos. 9–12. The polymers containing higher proportions of caprolactam maintain their properties better at elevated temperatures than do those with lower proportions of caprolactam.

EXAMPLE II

A polymer prepared in accordance with Run No. 10 in Example I was extruded to form a Spandex type monofil under the following conditions;

| | |
|---|---|
| Extrusion Machine | Brabender |
| Temperature (all zones) | 175°C. |
| Screw speed | 10 r.p.m. |
| Die pressure | 1400–1500 psi |
| Die orifice diameter | 0.030" |

The extruded monofil was drawn through a water bath to quench the same, and wound up with application of talc to prevent cohesion. The filament was then drawn approximately 350 percent over a hot bar at 55–60°C.

of 5 hours. The reason for this was that it was anticipated that prolonged heating would result in a substrate polymer of excessive length.

Water and acetone extractables, and relative viscosity in phenol/tetrachloroethane were determined as in Example I. Also the relative viscosity in sulfuric acid was determined: in this solvent, the polycaprolactone substrate is hydrolyzed, and the relative viscosity figure is a measure of the molecular weight of the polycaprolactam blocks. The amount of a polymer used was such as to yield a 1 percent solution of the polycaprolactam, assuming complete hydrolysis of the polycaprolactone. Following are the results of the runs.

TABLE II

| | Reactants varied, grams | | Extractable, percent | | Relative viscosity in— | |
|---|---|---|---|---|---|---|
| Run No. | Caprolactam | Sodium dispersion | Water | Acetone | Phenol-tetrachloroethane | H₂SO₄ |
| 13 | 100 | 0.187 | 21.61 | 7.99 | 1.39 | 1.12 |
| 14 | 100 | 0.385 | 10.37 | 3.92 | 1.47 | 1.13 |
| 15 | 100 | 0.75 | 5.78 | 3.85 | 1.49 | 1.13 |
| 16 | 100 | 1.50 | 5.71 | 5.20 | 1.40 | 1.12 |
| 17 | 66.7 | 0.187 | 19.90 | 26.79 | 1.37 | 1.12 |
| 18 | 66.7 | 0.385 | 9.45 | 12.39 | 1.49 | 1.14 |
| 19 | 150 | 0.45 | 9.51 | 1.74 | 1.59 | 1.13 |
| 20 | 234 | 0.60 | 9.05 | 0.35 | 1.66 | 1.12 |
| 21 | 400 | 0.90 | 6.15 | 0.0 | 1.78 | 1.17 |
| 22 | 900 | 1.80 | 3.49 | 0.0 | 1.44 | 1.15 |

EXAMPLE IV

| | |
|---|---|
| Block Copolymer (prepared per Example III identity per Table III) | 10 grams |
| Diepoxide resin ("Epon 828", a product of Shell Chemical Co.) | 0.3–1.2 grams (per Table III) |

A series of compositions was prepared in accordance with the foregoing schedule, using different resins prepared as described in Example III, and varying the ingredients as set forth hereinafter in Table III. The ingredients were milled together and the several compounds were then cured in a laboratory press at 285° F. (140°C.) for 2 hours to form test specimens 6 inches × 6 inches × 0.1 inches. They were then tested with results as indicated in Table III.

TABLE III

| Run No. | Identity of base resin Run No. Ex. III | Diepoxide resin, grams | Physical properties | | Modulus (p.s.i.) at elongation of— | | | Shore hardness, A |
|---|---|---|---|---|---|---|---|---|
| | | | Tensile strength, p.s.i. | Elongation, percent | 100 percent | 200 percent | 300 percent | |
| 23 | 15 | .3 | 2,860 | 450 | 950 | 1,200 | 2,380 | 95 |
| 24 | | .6 | 2,680 | 410 | 925 | 1,200 | 2,566 | 94 |
| 25 | | 1.2 | 2,000 | 220 | 1,200 | 1,725 | | 92 |
| 26 | 18 | .6 | 2,100 | 650 | 625 | 750 | 1,120 | 92 |
| 27 | | 1.2 | 1,300 | 230 | 700 | 1,000 | | 88 |

1. Process of producing a block copolymer of polylactone and polylactam which comprises (Step I) Reacting
    a polylactone diol      1 mole
with
    a diisocyanate      1–2 moles
and
(Step II) Thereafter reacting
    the product of Step (I)
with
    caprolactam      0.5–1.5 grams per gram of polylactone diol used in the preparation of the product of Step (I)
in the presence of
    an anionic catalyst for the polymerization of caprolactam      a catalytic amount the segments in the final block copolymer derived from a polylactone chain in the original polylactone diol having segments of polycaprolactam chains inserted linearly therein during the reaction of Step (II).

2. Process in accordance with claim 1 wherein the block copolymer is further reacted with a curing agent to produce a cross-linked product.

3. Process according to claim 1, wherein the polylactone diol is poly(epsilon caprolactone) diol.

4. Process according to claim 2, wherein the curing agent is a diepoxide.

5. Process according to claim 1, wherein the diisocyanate is used in the amount of 1.20 to 1.40 mole per mole of polylactone diol.

6. Process according to claim 5, wherein the anionic catalyst is sodium metal and is employed in amount from 0.1 to 1.0 mole per mole-equivalent of diisocyanate group (-NCO) present in the diisocyanate used in the process.

7. A block copolymer according to claim 7, wherein the polylactone diol is poly(epsilon caprolactone) diol.

8. An elastic thread composed of the block copolymer of claim 7.

9. A hot-melt adhesive comprising the block copolymer of claim 7.

10. A block polymer produced by the process of claim 1.

* * * * *

PO-1050
(5/69)

UNITED STATES PATENT OFFICE
CERTIFICATE OF CORRECTION

Patent No. 3,758,631     Dated September 11, 1973

Inventor(s) Byron H. Werner and Robert A. Hayes

It is certified that error appears in the above-identified patent and that said Letters Patent are hereby corrected as shown below:

Col. 8, claim 7, line 1

"according to claim 7" should be

-- according to claim 10 --

Signed and sealed this 2nd day of April 1974.

(SEAL)
Attest:

EDWARD M. FLETCHER, JR.
Attesting Officer

C. MARSHALL DANN
Commissioner of Patents